United States Patent Office 3,749,616
Patented July 31, 1973

3,749,616
SOLID POLYURETHANE PROPELLANT AND METHOD OF MAKING THE SAME
Herman F. Krackenberger and Daniel J. Smith, Elkton, Md., assignors to Thiokol Chemical Corporation, Bristol, Pa.
No Drawing. Filed July 7, 1960, Ser. No. 41,428
Int. Cl. C06d 5/06
U.S. Cl. 149—19                                       10 Claims This invention relates to solid propellants of the type that are adapted to be cast in situ in the casing of a rocket motor or other devices using a solid fuel, and upon ignition, to provide the propulsive force for such a rocket motor. The invention also relates to a method of making such a propellant.

Solid propellant rocket motors are commonly made by preparing a mixture of a finely divided inorganic oxidizing agent, a liquid polymer, a curing agent for the polymer, and minor amounts of various modifying ingredients, introducing the resulting mixture into a motor casing and curing the mixture in situ to form a case-bonded solid propellant charge within the motor. The cured polymer acts both as a fuel for reaction with the oxidizing agent and as a binder to provide the propellant charge with the desired physical properties.

Liquid polymers to be used for this purpose must meet numerous different requirements. Thus they must mix readily with the necessary quantity of inorganic oxidizer to form a composition that is sufficiently flowable for satisfactory casting in the motor casing. In their role of fuel they should have as high a heat of combustion as possible and desirably a high ratio of hydrogen to carbon. In their role as binder they should desirably be curable at relatively low temperature and without significant dimensional changes to a rubbery material of good physical strength. The resilience and tensile strength of the cured polymer are important in achieving a propellant grain capable of withstanding physical shock without fracturing and also in reducing the possibility of crack formation due to differential thermal expansion during temperature changes of the propellant charge.

One general type of polymer that has been proposed for this purpose is an isocyanate-modified polyester. Such polymers have been prepared by reacting a dibasic acid, e.g., adipic acid with a molar excess of polyhydric alcohol, e.g., a glycol to form a hydroxyl-terminated polyester. The polyester is then reacted with a molar excess of diisocyanate, e.g., p-tolylene diisocyanate, to form an isocyanate-terminated pre-polymer. Compounding of the propellant composition is effected by mixing the pre-polymer with an inorganic oxidizer such as ammonium perchlorate and a curing agent such as a polyol or an alkanolamine. The propellant composition in fluid form is charged into a motor casing and cured in situ therein to form a solid propellant grain bonded to the interior wall of the motor casing.

It has been found that the previously proposed pre-polymers of this type have been subject to a number of disadvantages. Thus they have a tendency to absorb water from the atmosphere and from other ingredients of the propellant composition during mixing. Such absorbed water reacts with the isocyanate groups of the pre-polymer, and during curing of the propellant composition this reaction generates carbon dioxide gas that forms bubbles that are trapped within the propellant charge. Such discontinuities in the body of the propellant produce uneven and/or unpredictable combustion.

Efforts to overcome this problem have included pre-drying of the ingredients of the propellant composition before formulation and mixing the propellant ingredients in a controlled moisture-free atmosphere. However, such measures increase the complexity and expense of the propellant compounding process and are not completely effective in any case.

As the proportion of inorganic oxidizer in the propellant formulation is increased, the pre-casting viscosity of the mixture also increases, and eventually a point is reached at which the viscosity is too high to permit satisfactory casting in the motor casing. With the isocyanate terminated pre-polymers previously proposed, this maximum workable viscosity is reached at an oxidizer concentration that is less than the desired value.

In the case of the larger rocket motors designed to provide the propulsive force for ballistic missiles, there is a distinct advantage in using propellant that give relatively long burning times. Solid propellants differ from liquid propellants in that the rate of combustion of a solid propellant cannot be effectively controlled after it is ignited. The burning time of a solid propellant charge is largely dependent upon the inherent burning rate of the material being used. With the isocyanate-terminated polymers previously proposed as fuel binders, the burning rate of the propellant formulations made therefrom has been higher than desirable.

It is accordingly an object of the present invention to provide a solid propellant of the type that has a polyurethane fuel binder and which is substantially free from gas pockets. It is another object of the invention to provide a polyurethane-containing solid propellant having a higher loading of inorganic oxidizer than can be attained with the fuel-binders of this type previously proposed. It is a further object of the invention to provide a solid propellant having a relatively low burning rate. It is a still further object of the invention to provide a method of making a propellant having a polyurethane binder, which method employs an isocyanate-terminated liquid pre-polymer that has a substantially reduced tendency to absorb water from the atmosphere or from other ingredients of the composition, so that the propellant can be formulated in an open mixer without taking special precautions to prevent atmospheric moisture from coming in contact therewith. Other objects of the invention will be in part obvious and in part pointed out hereafter.

The objects and advantages of the present invention can be achieved in general by utilizing as the fuel-binder of a solid propellant composition a polymeric material containing hydrocarbon radicals that are derived from a polymeric fatty acid. It is known that unsaturated $C_{18}$ fatty acids, such as oleic acid and linoleic acid, can be polymerized to give dimers and trimers containing 36 and 54 carbon atoms respectively. Commercial mixtures containing various proportions of the dibasic acid and tribasic acid are available and can be used satisfactorily in preparing the products of the present invention. When such polymeric fatty acids are suitably incorporated in the fuel binder of a solid propellant composition as described hereafter, the resulting fuel binder has an exceptionally favorable ratio of hydrogen to carbon and a high ratio of methylene groups to oxygen. Hence it is a highly efficient fuel.

The incorporation of the polymeric fatty acid in the fuel-binder involves a number of steps that will now be described. The polymeric acid is first heated with a polyhydric alcohol to form a linear polyester by condensation and dehydration. Since the reaction of a polybasic acid with a polyhydric alcohol to form a linear polyester is well known, and since the conventional reaction conditions can be used for this step of the process, it is deemed unnecessary to describe the polyester formation in detail. Any of the polyhydric alcohols and amino alcohols that have been previously used for producing polyesters of this type can be employed such as ethylene glycol, diethylene glycol, glycerol, sorbitol, pentaerythritol, trimethylolpropane and trimethylolethane, as well as amino alcohols such as ethanolamines, aminopropanols and other lower aminoalkanols. Preferably a molar excess of the polyhydric alcohol is used to provide the polyester with hydroxyl terminals. Suitable polyesters may have a molecular weight of the order 2,000 to 3,000.

In the next step of the process, the polyester is provided with isocyanate terminals by reacting it with a molar excess of polyisocyanate to produce a pre-polymer. Any of the organic polyisocyanates that have been previously proposed for the preparation of polyurethane resins may be employed in this step of the process. Suitable polyisocyanates include arylene polyisocyanates such as tolylene diisocyanates; meta-phenylene diisocyanate; 4 - chloro-1, 3 phenylene diisocyanate; methylene - bis - (4 - phenyl isocyanate); 1,5 - naphthalene diisocyanate; 3,3' - dimethoxy - 4,4' - biphenylene diisocyanate; 3,3' - diphenyl-4,4' - biphenylene diisocyanate; triphenyl-methane triisocyanate; and alkylene polyisocyanates such as ethylene; ethylidene; propylene - 1,2-; butylene 1,3-; hexylene 1,6-; and cyclohexylene 1,2-diisocyanates. Meta-toluene diisocyanates, which are presently the diisocyanates most widely used commercially for this purpose, are entirely satisfactory for preparing the present product. A commercial mixture consisting of about 80% of the 2,4 isomer and 20% of the 2,6 isomer sold under the trade name Hylene TM may be advantageously used. Also p-tolylene diisocyanate has been found especially useful. A molar excess of the polyisocyanate is used to provide the pre-polymer with isocyanate terminals through which it can be cured.

The isocyanate-terminated pre-polymer as thus prepared is mixed with an inorganic oxidizer such as powdered ammonium perchlorate, a curing agent for the pre-polymer and various modifying ingredients as indicated in the specific examples given below. The curing agent for the pre-polymer is desirably a polyhydroxy compound. Suitable polyols for this purpose include castor oil, triisopropanolamine, phenyldiethanolamine, ethylene glycol monoricinoleate, dihydroxy castor oil, trimethylolpropane. Also the hydroxyl-terminated polyester formed in the first step mentioned above may be used as a curing agent. Ethylene glycol monoricinoleate, which has a primary alcohol group, has been found to give a faster cure than is obtained when using curing agents containing only secondary hydroxy groups. It has been found that isocyanate-terminated pre-polymers built up from polymeric fatty acids as described above have excellent processing characteristics in the formulation of solid propellant compositions. Although the molecular weight of the acid component used as a starting material is substantially greater than that of previous products of this type, it has been found that surprisingly the present pre-polymer can be compounded with the oxidizer and other propellant ingredients at least as easily as, and in some compositions more easily than, prior similar pre-polymers. Curing can be effected at temperatures of 70° F. to 140° F. The lower end of this range is well below the curing temperatures required with prior isocyanate-modified polyesters. Also the present products are considerably less hygroscopic than prior similar products, and thus the processing problems encountered as a result of the hygroscopic character of the prior products are mitigated. As indicated by the specific examples given below, the cured pre-polymer has good strength and elastic properties and can be used to make propellant compositions having relatively low burning rates.

In order to point out more fully the nature of the present invention, the following specific examples are given of solid propellant compositions incorporating the invention and illustrative methods by which they may be made.

Example 1

A commercial mixture of the dimer and trimer of linoleic acid containing about 75% dimer and 25% trimer was reacted with diethylene glycol to form a polyester. More particularly 675 parts by weight (1.0 mol) of the polybasic acid and 159 parts by weight (1.5 mols) of diethylene glycol were mixed in a resin kettle. The mixture was heated under a nitrogen atmosphere to 140° to 150° C. and maintained at this temperature under total reflux for about an hour. At the end of the reflux period a partial condenser was connected to the kettle and the water was removed from the mixture.

The temperature was then gradually raised to 225° C. over a period of about 7 hours. During the first half of this heating period, the resin mixture was maintained at atmospheric pressure, whereas during the latter half of the heating period, the pressure was gradually reduced to approximately 50 mm. absolute. Analysis of the resulting polyester showed that it had a hydroxyl number of 55.9, an acid number of 1.4, a water content of 0.05% by weight and a molecular weight of about 2,000 to 3,000.

The polyester as thus prepared was reacted with a molar excess of p-tolylene diisocyanate to form a pre-polymer. More particularly, 200 parts of the polyester was gradually added to 43.5 parts of the diisocyanate in the resin kettle. The temperature of the resulting mixture was raised to 120° C. over a period of about 12 minutes and this temperature was maintained for approximately one-half hour. Analysis of the resulting pre-polymer showed that it had an NCO content of 6.1% by weight.

The pre-polymer as thus prepared was incorporated in a propellant formulation. A mixture of 11.11 parts by weight of the pre-polymer and 6.89 parts of castor oil was degassed in an evacuated vessel at 140° F. Thereafter, 20 parts of 8–10 micron size aluminum powder was mixed with the liquid materials until the metal powder was thoroughly wetted. This pre-mix was combined with 62 parts of finely divided solid ammonium perchlorate in an open mixer and mixing continued under atmospheric conditions until a uniform mixture was obtained.

It should be noted that the particle size of the oxidizer used in solid propellant compositions has a significant effect on the properties of the propellant. Ammonium perchlorate as received from the manufacturer typically has a particle size range of 50 to 400 microns with a mean size of about 175 microns. It is customary to reduce the particle size of the perchlorate as received in a suitable apparatus such as a hammer mill to a material having a size range of say 3 to 100 microns with a mean size of about 25 microns. Predetermined amounts of the ground and unground material are then blended to form the oxidizer component of the propellant.

The relative amount of the ground and unground material used is commonly referred to as the "bimodal distribution" of the oxidizer and is represented by a percentage ratio. Thus the bimodal distribution of the ammonium perchlorate used in the present example was 92.6/7.4, that is to say, of the 62 parts by weight used, 92.6% (57.4 parts) was unground material and 7.4% (4.6 parts) was ground material.

The propellant mixture was deaerated by causing it to flow through a narrow slit in a metal plate and then cast in a motor casing at 110° to 135° F. Curing of the composition was effected by maintaining it at a temperature of 100° F. for a period of 48 hours, during which period the composition became a rubbery solid. The physical and ballistic properties of the resulting propellant was measured and determined to be as follows:

| | |
|---|---|
| Tensile strength (p.s.i.) | 104 |
| Strain (in./in.) | 0.487 |
| Modulus (p.s.i.) | 420 |
| Density (lbs./in.³) | 0.063 |
| Buring rate (in./sec. at 500 p.s.i.a.) | 0.185 |
| Specific impulse ($I_{sp}$ at 500 p.s.i.a.) | 215 |

Example 2

The procedure of Example 1 was followed except that the amount of isocyanate-terminated pre-polymer was increased from 11.11 to 14.44 parts and the 6.89 parts of castor oil was replaced by a curing agent comprising 3.29 parts of ethylene glycol monoricinoleate and 0.27 part of trimethylolpropane. The propellant composition was cured for a period of 20 hours at 100° F. The physical properties of the resulting composition were as follows:

| | |
|---|---|
| Tensile strength (p.s.i.) | 187 |
| Strain (in./in.) | 0.545 |
| Modulus (p.s.i.) | 437 |

Example 3

The procedure of Example 1 was followed except that 11.68 parts of the pre-polymer were used and the 6.89 parts of castor oil curing agent was replaced by 6.32 parts of dihydroxy castor oil. Curing was effected over a period of 40 hours at a temperature 100° F. and the physical properties of the cured composition were as follows:

| | |
|---|---|
| Tensile strength (p.s.i.) | 62 |
| Strain (in./in.) | 1.047 |
| Modulus (p.s.i.) | 119 |

Example 4

The procedure of Example 1 was followed except that the amount of pre-polymer used was 7.27 parts and the castor oil curing agent was replaced by 0.14 part of trimethylolpropane and 10.59 parts of the dihydroxy polyester produced in the first step of Example 1. Curing of the composition was effected over a period of 44 hours at 100° F. and the physical properties of the resulting composition were as follows:

| | |
|---|---|
| Tensile strength (p.s.i.) | 147 |
| Strain (in./in.) | 1.003 |
| Modulus (p.s.i.) | 255 |

Example 5

The procedure of Example 1 was followed with the exceptions noted herein. The pre-polymer was mixed with 62 parts of ammonium perchlorate and 20 parts of aluminum powder as in Example 1. The total amount of pre-polymer and curing agent was 18 parts as in Example 1, but dihydroxy castor oil was used as the curing agent in place of the ordinary castor oil of Example 1. Several formulations were made and cured using different ratios of pre-polymer to curing agent to determine the effect of varying this factor with the results given below. The relative amounts of isocyanate-terminated pre-polymer and curing agent used are expressed in terms of the ratio of reactive NCO groups in the pre-polymer to reactive hydroxyl groups in the curing agent.

| NCO/OH | 0.9/1.0 | 1.0/1.0 | 1.1/1.0 | 1.3/1.0 |
|---|---|---|---|---|
| Tensile strength (p.s.i.) | 74 | 109 | 110 | 131 |
| Strain (in./in.) | 0.531 | 0.351 | 0.316 | 0.290 |
| Modulus (p.s.i.) | 229 | 456 | 553 | 711 |

The foregoing data show that a variety of elastomeric properties can be achieved by varying the NCO/OH ratio in the propellant formulation.

Example 6

This example illustrates the manner in which propellant compositions can be formulated according to the present invention having different burning rates. Three propellants were formulated using essentially the procedure of Example 1 except as indicated herein. The three propellants had substantially the same specific impulse. Formulation 1 was the same as that of Example 1 and had as indicated in Example 1 a burning rate of 500 p.s.i.a. of 0.185 inch per second.

Formulation 2 differed from that of Example 1 in that it contained 17.0 parts aluminum, 8.22 parts of the isocyanate terminated pre-polymer, and 6.78 parts of castor oil. The oxidizer bimodal distribution was changed from a 92.60/77.40 ratio to 62.5/37.5 ratio. Its burning rate at 500 p.s.i.a. was 0.30 inch per second.

Formulation No. 3 differed from that of Example 1 in that it contained 13.0 parts of aluminum powder, 12.42 parts of the prepolymer and 9.58 parts of castor oil. The oxidizer bimodal distribution was changed to 84.0/16.0 ratio. Its burning rate at 500 p.s.i.a. was 0.129 inch per second.

Example 7

This example illustrates the manner in which the specific impulse of propellants prepared according to the present invention can be varied without significant alteration in their burning rates. The general procedure of Example 1 was followed, but the proportions of ingredients used in formulating the propellants were modified as indicated below:

| Percent: | | |
|---|---|---|
| Ammonium perchlorate (unground) | 42.50 | 68.00 |
| Ammonium perchlorate (ground) | 18.50 | 13.00 |
| Aluminum | 24.00 | 4.00 |
| Pre-polymer | 8.22 | 8.22 |
| Castor oil | 6.78 | 6.78 |
| Tensile strength (p.s.i.) | 100 | 75 |
| Strain (in./in.) | 0.608 | 0.43 |
| Modulus (p.s.i.) | 350 | 225 |
| Buring rate (in./sec.) 500 p.s.i. | 0.255 | 0.255 |
| Specific impulse (lb.-sec./lb.) 1,000 p.s.i.a. | 262 | 245 |

The foregoing data show that by changing the proportion of aluminum powder from 4% to 24% of the formulation and modifying the ammonium perchlorate bimodal distribution, the value of specific impulse can be increased from 245 to 262 lb.-sec./lb. without any substantial variation in the burning rate. When a marked change in burning is desired, other known additives may be used in place of or in combination with the aluminum powder in such compositions without marked reduction in specific impulse or deterioration of physical properties. For example ferrocene, magnesium hydride, iron oxide, a series of pyromellitates ($Fe^{+++}$, $Fe^{++}$, $Ni^{++}$, $Co^{++}$) as well as numerous others can be employed.

Propellant compositions formulated in the manner disclosed herein have been extensively tested in rocket motors and have given highly satisfactory test firings. Because of the increased moisture tolerance of these formulations due to the character of the pre-polymer used, the tendency toward gas pocket formation during curing of the propellant charge is substantially reduced. X-ray examination of the propellant charges of some of the larger test motors has indicated that the propellant was remarkably free from fault, such faults being limited to mechanically produced pockets of perhaps ¼ in. in diameter which do not ordinarily cause trouble in firing. As indicated above, the use of the present pre-polymers in the formulation of propellants eliminates a number of processing difficulties and generally facilitates the preparation and casting of the propellant composition. Somewhat higher loadings of inorganic oxidizer and metal powder can be used with these pre-polymers to yield propellants having an exceptionally high specific impulse. Also a variety of low-burning-rate propellants can be formulated.

It is, of course, to be understood that the specific examples given herein are intended to be illustrative only and that numerous changes can be made in the ingredients, proportions and conditions specifically set forth. This is particularly true of the steps involved in compounding of the pre-polymer into a solid propellant. Since isocyanate-terminated pre-polymers of other types than those disclosed herein have been extensively tested as fuel-binders in propellant compositions, a large number of variations in compounding techniques are known to those skilled in the art, and hence it is deemed unnecessary to set forth these variations in detail herein.

We claim:

1. A solid propellant consisting essentially of a solid inorganic oxidizer and a polyurethane fuel binder, said fuel binder being a cured isocyanate-terminated polyester having an acid component derived from an acid that is a polymer of an unsaturated $C_{18}$ fatty acid.

2. A solid propellant consisting essentially of a solid inorganic oxidizer and a polyurethane fuel binder, said fuel binder being a cured isocyanate-terminated polyester having an acid component derived from a mixed acid, said mixed acid being a mixture of the dimer and trimer of an unsaturated $C_{18}$ fatty acid.

3. A solid propellant consisting essentially of a solid inorganic oxidizer and a polyurethane fuel binder, said fuel binder being the reaction product of a polyol and an isocyanate-terminated polyester having an acid component derived from an acid which is a polymer of an unsaturated $C_{18}$ fatty acid.

4. A solid propellant consisting essentially of a solid inorganic oxidizer and a polyurethane fuel binder, said fuel binder being a cured isocyanate-terminated polyester which is a reaction product of a polyisocyanate and a polyester having an acid component derived from a mixed acid, said mixed acid being a mixutre of the dimer and trimer of an unsaturated $C_{18}$ fatty acid.

5. A solid propellant consisting essentially of a solid inorganic oxidizer and a polyurethane fuel binder, said fuel binder being a cured isocyanate-terminated polyester, said polyester being the reaction product of a polyhydric alcohol and a polybasic acid, said polybasic acid being a mixture of the dimer and trimer of an unsaturated $C_{18}$ fatty acid.

6. A solid propellant consisting essentially of a solid inorganic oxidizer and a polyurethane fuel binder, said fuel binder being the reaction product of a polyol and an isocyanate-terminated polyester, said isocyanate-terminated polyester being the reaction product of a polyisocyanate and a polyester, said polyester being the reaction product of a polyhydric alcohol and a polybasic acid, said polybasic acid being a mixture of the dimer and trimer of an unsaturated $C_{18}$ fatty acid.

7. A solid propellant according to claim 6 and wherein said inorganic oxidizer is ammonium perchlorate, said polyol is castor oil, said polyisocyanate is p-tolyene diisocyanate, said polyhydric alcohol is diethylene glycol and said polybasic acid is a mixture of the dimer and trimer of linoleic acid.

8. In a method of making a solid propellant consisting essentially of a polyurethane fuel binder and solid inorganic oxidizer, said method being of the type wherein a polycarboxylic acid is condensed with a polyhydric alcohol to form a polyester, the polyester is reacted with a polyisocyanate to form an isocyanate-terminated polyester prepolymer, and the pre-polymer is mixed with a polyol and said oxidizer and cured to form said solid propellant, the improvement which comprises using as at least a major part of said polycarboxylic acid, a polymer of an unsaturated $C_{18}$ fatty acid.

9. In a method of making a solid propellant consisting essentially of a polyurethane fuel binder and solid inorganic oxidizer, said method being of the type wherein a polycarboxylic acid is condensed with a polyhydric alcohol to form a polyester, the polyester is reacted with a polyisocyanate to form an isocyanate-terminated pre-polymer, the prepolymer is mixed with a polyol and said inorganic oxidizer and the resulting mixture is cured to form said solid propellant, the improvement which comprises using as at least a major part of said polycarboxylic acid, a mixture of the dimer and trimer of linoleic acid.

10. A method of making a solid propellant which comprises reacting a polybasic acid which is a mixture of the dimer and trimer of an unsaturated $C_{18}$ fatty acid with a polyhydric alcohol to form a polyester, reacting said polyester with a polyisocyanate to form an isocyanate-terminated pre-polymer, mixing said pre-polymer with a polyol curing agent, aluminum powder and a solid inorganic oxidizer, and curing the resulting mixture to form said solid propellant.

References Cited

UNITED STATES PATENTS 2,855,372  10/1958  Jenkins _____ 52—.5

OTHER REFERENCES

Zaehringer: "Solid Propellant Rockets-Second Stage," American Rocket Co., Box 1112, Wyandotte, Mich., 1958, pp. 211–215.

Zaehringer: Missles and Rockets, vol. 5, No. 2, Jan. 12, 1959, pp. 16 and 17.

BENJAMIN R. PADGETT, Primary Examiner

U.S. Cl. X.R.

149—20